(12) United States Patent
Shinohara et al.

(10) Patent No.: US 7,062,676 B2
(45) Date of Patent: Jun. 13, 2006

(54) METHOD AND SYSTEM FOR INSTALLING PROGRAM IN MULTIPLE SYSTEM

(75) Inventors: Tomohiro Shinohara, Yokohama (JP); Hodaka Furuya, Yokohama (JP); Yoji Sunada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 210 days.

(21) Appl. No.: 10/795,028

(22) Filed: Mar. 4, 2004

(65) Prior Publication Data

US 2005/0102562 A1   May 12, 2005

(30) Foreign Application Priority Data

Nov. 12, 2003   (JP) .............................. 2003-382627

(51) Int. Cl.
*G06F 11/00* (2006.01)
(52) U.S. Cl. .............................. 714/15; 714/4; 714/11; 714/12; 714/13; 717/168; 717/171; 717/174; 717/176
(58) Field of Classification Search .................... 714/4, 714/11–13; 717/168–178
See application file for complete search history.

(56) References Cited

U.S. PATENT DOCUMENTS

| 6,618,805 B1 | 9/2003 | Kampe |
| 6,681,390 B1 | 1/2004 | Fiske |
| 2002/0092010 A1* | 7/2002 | Fiske .......................... 717/168 |
| 2002/0188711 A1* | 12/2002 | Meyer et al. ................ 709/223 |
| 2003/0018927 A1* | 1/2003 | Gadir et al. ................... 714/4 |

FOREIGN PATENT DOCUMENTS

JP           11-353292         12/1999

* cited by examiner

*Primary Examiner*—Robert Beausoliel
*Assistant Examiner*—Charles Ehne
(74) *Attorney, Agent, or Firm*—Townsend and Townsend and Crew LLP

(57) ABSTRACT

It is an object of the present invention to allow easy upgrading of the version of the OS in a failover cluster system. When the user mounts a storage medium 4 on the node 1, and gives instructions to install a program, the installation program 12 requests the failover program 11 for the stopping of heartbeat communications. The node 1 voluntarily stops heartbeat communications in a state in which the system of this node is operating normally. When the failover program 21 of the node 2 detects the stopping of heartbeat communications, this program starts failover, and takes over the business service of the node 1. During the execution of failover by the node 2, the program stored in the storage medium 4 is installed in the node 1. When this installation is completed, the node 1 transmits a failback request to the node 2, and restarts the business service.

14 Claims, 10 Drawing Sheets

METHOD AND SYSTEM FOR INSTALLING PROGRAM IN MULTIPLE SYSTEM

CROSS-REFERENCE TO RELATED APPLICATIONS

This application relates to and claims priority from Japanese Patent Application No. 2003-382627 filed on Nov. 12, 2003, the entire disclosure of which is incorporated herein by reference.

BACKGROUND OF THE INVENTION

1. Field of the Invention

The present invention relates to a method and system for installing program in a multiple system.

2. Description of the Related Art

The term "cluster system" refers to a system in which a plurality of computers (also called nodes) are roughly joined to form a single system. For example, cluster systems include load dispersion type systems, failover type systems and the like. The term "failover cluster system" refers to a system which is endowed with redundancy by means of a plurality of computers. In a failover system, when one computer stops, business is taken over by other computers, so that the continuity of business application services is guaranteed to client computers. This first computer and other computers are connected via a communications line (interconnect) such as an LAN or the like, and the stopping of the companion computers is monitored by performing heartbeat communications between the computers.

The term "heartbeat communications" refers to a technique in which signals used to indicate that the functioning of a computer has not stopped are exchanged between a plurality of computers in a failover relationship, so that stopping of the functioning of the computers is mutually monitored. While heartbeat communications are being performed, it is judged by the monitoring computer that the companion computer in question is operating normally, and failover (takeover of business) is not performed. Conversely, when heartbeat communications are interrupted, it is judged that the system of the companion computer is down, and the business application that was provided by the companion computer is taken over by the monitoring computer. From the client computers utilizing the business application, the failover cluster as a whole is viewed as though this cluster were a single computer. Accordingly, even when processing is switched from a computer currently in use to a waiting computer, the client computers are not aware of the identity of the computer from which the business application service is being provided. Here, if failover is executed without any consideration being given to the operating state of the abovementioned monitoring computer, the computer that executes this failover is itself subjected to an excessive burden, so that there is a possibility of a drop in the response characteristics or the like. Japanese Patent Application Laid-Open No. 11-353292 discloses a technique in which the priority of the business application is altered in accordance with the operating state of the computer that takes over the abovementioned business.

As a result of conspicuous advances made in software techniques and the like, there is a need for suitable improvement in the software environment of computers that form the abovementioned cluster. For example, the OS (operating systems) of the computers are appropriately updated in order to improve security and improve file sharing services or the like. Furthermore, software such as application programs other than the OS, as well as device drivers, firmware and the like, are also appropriately altered in accordance with changes in the environment.

When such updating or upgrading of the version of the OS or the like is performed, the manager installs the new OS manually with the computer in a state of planned stoppage, and restarts the computer after the installation is completed.

SUMMARY OF THE INVENTION

When the version of the OS or the like of a computer that configures a part of a failover cluster system is upgraded (or downgraded), there may be cases in which restarting is necessary (depending on the program). Since the restarting of a computer involves stopping of the computer, the service providing a business application is temporarily interrupted. Since heartbeat communications are cut off when the computer is stopped, failover is executed by the other computers in the system. However, a specified time lag occurs between the interruption of heartbeat communications and the execution of failover.

Accordingly, in the case of version upgrading that involves restarting of the computer, the manager first (by means of a manual operation) causes failover to be executed by the failover destination computer. As a result, the service that provides the business application is taken over by the failover destination computer. Then, the computer that originated the failover stops the service providing the business application. The manager then installs new software in the computer that originated the failover.

Thus, when new software is installed in a computer, and especially when installation work that involves restarting of the computer is performed, the manager must actuate failover by a manual operation. Accordingly, the following problem arises: namely, if the manager is not familiar with the failover cluster system, the manager cannot install new software, so that the convenience of the system for use is poor. Specifically, while the new software can be automatically installed by an installer, preparations on the computer side require (for example) a manual operation by an experienced manager.

It is one object of the present invention to provide a failover cluster system and a program installation method using this failover cluster system which are devised so that program installation work can be simply performed. Furthermore, it is another object of the present invention to provide a failover cluster system and a program installation method using this failover cluster system which are devised so that program installation work can be automated by means of a relatively simple construction. Other objects of the present invention will be clear from the description of embodiments below.

A failover cluster system according to an embodiment of the present invention comprises a first computer and second computer that are mutual objects of failover, wherein the second computer transmits an installation permission signal to the first computer when a state of a stopped process in the first computer is detected, and the first computer installs a specified program when an installation permission signal is received from the second computer.

For example, by causing heartbeat communications to be performed between the first computer and second computer, it is possible to detect a state of a stopped process in the companion computer when the heartbeat communications are cut off for a specified time or longer. When the second computer detects a state of a stopped process in the first computer, the second computer executes failover. Furthermore, when the second computer detects a state of a stopped process in the first computer, the second computer transmits an installation permission signal to the first computer. This installation permission signal is a signal which indicates that a state of a stopped process in the first computer has been detected by the second computer, and is associated with the execution of failover by the second computer. Accordingly, if the first computer generates a state of a stopped process voluntarily and in a feigned manner prior to the installation of the specified program, the specified program can be installed after failover is actuated by the second computer. The term "voluntary and feigned state of a stopped process" refers to a state in which the first computer shows a state of a stopped process to the second computer in spite of the fact that the first computer is operating normally. In concrete terms, for example, a feigned state of a stopped process can be generated by voluntarily stopping the abovementioned dead-or-alive confirmation signals.

Then, when the installation of the specified program is completed, the first computer can request failback from the second computer. As a result, the first computer restarts the provision of service to the client computers. Furthermore, since the failover cluster system as a whole is seen as a single computer from the client computers, the client computers are not aware of which computer is actually providing the service.

DESCRIPTION OF THE PREFERRED EMBODIMENTS

Figure 1:
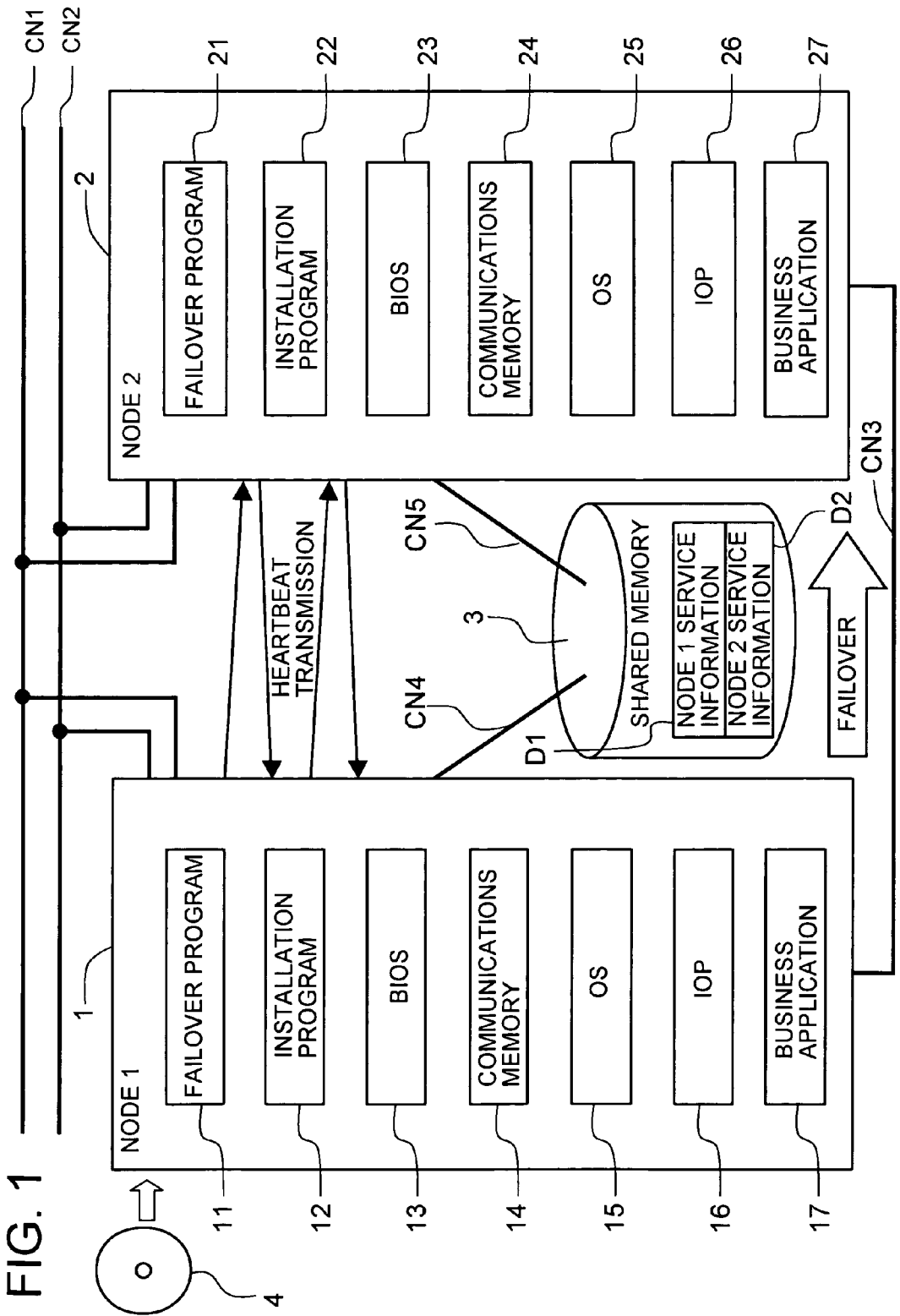
FIG. 1 is a functional block diagram which shows an overall outline of a failover cluster system constituting an embodiment of the present invention.

Embodiments of the present invention will be described below with reference to FIGS. 1 through 10.

The failover cluster system of the present invention is a failover cluster system which comprises a first computer and second computer that are mutual objects of failover, and in which failover is executed on the basis of the state of heartbeat signal communications performed between the first computer and second computer. The first computer comprises a first failover program which causes failover to be actuated by the second computer by voluntarily stopping heartbeat signal communications on the basis of a heartbeat communications stop request that is issued from an installation program that performs preparations for the installation of an OS construction altering program (with this request being issued prior to the installation of this construction altering program), and an installation control program which starts an installer program and installs the construction altering program by restarting the OS when a restart signal based on the stopping of the heartbeat signals is received from the second computer. Furthermore, the first failover program requests the second computer for failback when the installation of the construction altering program is completed. Moreover, the second computer comprises a second failover program which executes failover when heartbeat signal communications with the first computer are stopped, and a restart request program which transmits a restart signal to the first computer when heartbeat signal communications with the first computer are stopped. Furthermore, the second failover program stops the execution of failover when failback is requested by the first computer.

For example, the first computer and second computer (nodes) provide a business application such as a file sharing service or the like to client computers. For instance, the first computer and second computer are connected via a communications network such as an LAN (local area network) or the like so that two-way communications are possible. For example, the first computer and second computer respectively comprise storage devices (memory storage resources) such as disk storage devices, semiconductor memory storage devices or the like. For example, the respective computers and storage devices are connected via a communications network such as an SAN (storage area network) or the like.

The first and second computers are mutual objects of failover. Specifically, when the first computer stops, the second computer takes over the business of the first computer. Conversely, when the second computer stops, the first computer takes over the business of the second computer. When the service is thus transferred between the first and second computers, the data that is to be taken over is stored (for example) on a shared disk. The first and second computers can execute failover as a result of sharing this shared disk. Furthermore, the system may also be constructed so that the service is taken over by synchronizing (mirroring) the content of the storage device of the first computer and the content of the storage device of the second computer.

Whether or not the companion computer has stopped is detected according to the heartbeat signal communications state. For example, when heartbeat communications are interrupted for a specified period of time or longer, it is judged that the companion computer has stopped, and failover is executed by the first failover program or second failover program.

When the version of the OS of the first computer is upgraded (updated), the installation program sends a heartbeat communications stop request to the first failover program prior to the installation work. The first failover program that receives this request voluntarily stops heartbeat communications. Here, the "voluntary stopping of heartbeat communications" differs from ordinary cases in which heartbeat communications are stopped as a result of the system going down; this term refers to a deliberate stopping of heartbeat communications under conditions in which the computer is operating normally. As a result, in the second computer, it is judged that the first computer has stopped functioning. Furthermore, this can also be applied to cases in which the version of the OS of the first computer is downgraded (cases in which the OS is returned to a previous construction).

When the first computer voluntarily stops heartbeat communications, the second failover program executes failover, so that the second computer takes over the service that was previously provided by the first computer. Furthermore, when the first computer voluntarily stops heartbeat communications, the restart request program of the second computer transmits a restart signal to the first computer. This restart signal is transmitted when the second computer detects the stopping of heartbeat communications. The stopping of heartbeat communications prompts the execution of failover by the second computer. Accordingly, the restart signal indicates the execution of failover or planned execution of failover by the second computer. When the installation control program of the first computer receives a restart signal from the second computer, this program starts the installer program and installs the construction altering program. Likewise, when restarting is required in upgrading of the version of the OS or the like, failover is executed by the second computer; accordingly, the service provided to the client computers is continued. Alternatively, the service is provided by the second computer after a relatively short period of time during which the service is stopped.

When the upgrading of the version of the OS of the first computer is completed, the first failover program requests the second computer for failback. After receiving this failback request, the second failover programs stops the failover. As a result, the service provided to the client computers is again provided from the first computer.

Here, for example, the OS construction altering program, installation program and installer program can be respectively stored in the same storage medium. Furthermore, for example, the installation program read out from the storage medium can be copied into the memory of the first computer and executed by the first computer.

EMBODIMENT 1

A first embodiment of the present invention will be described with reference to FIGS. 1 through 8. FIG. 1 is a functional block diagram which shows an overall outline of the failover cluster system of the present invention. As will be described later, the failover cluster system is divided into the following main parts: namely, a plurality of nodes 1 and 2, and a shared disk 3 which is shared by the respective nodes 1 and 2.

The node 1 that constitutes the "first computer" is constructed as a computer system comprising (for example) a CPU (central processing unit) and various memories, input-output circuits, communications interfaces and the like. In concrete terms, this node 1 is constructed as a server machine. The node 1 is connected to a plurality of client computers (not shown in the figures) via communications networks CN1 and CN2 used for service provision. The node 1 is connected to the node 2 via a communications network CN3. For example, the communications networks CN1 through CN3 are respectively constructed as communications networks such as LAN or the like. CN1 and CN2 may also be called external LAN, and CN3 may also be called an internal LAN. Furthermore, the node 1 is connected to the common disk 3 via a communications network CN4. For example, the communications network CN4 is constructed from a communications network such as an SAN or the like.

The node 1 comprises a failover program 11, an installation program 12, a BIOS 13, a communications memory 14, and OS 15, an IOP (input output processor) 16 and a business application program (abbreviated to "business application") 17. Furthermore, the node 1 comprises a medium interface (not shown in the figures) that is used to read out computer programs (hereafter abbreviated to "programs") and the like from the storage medium 4. As will be described later, the node 1 upgrades the version of the OS 15 by means of a program stored in the storage medium 4. Furthermore, various types of disk type storage media such as a hard disk, CD-ROM, CD-R, DVD-ROM, DVD-RAM, optical-magnetic disk or the like, or storage media such as a semiconductor memory or the like, can be used as the storage medium 4. Furthermore, the storage medium used is not limited to a shaped storage medium; the version of the OS 15 of the node 1 can also be upgraded using a communications medium.

The node 1 and node 2 perform heartbeat communications via the communications network CN3. Heartbeat communications constitute a method of monitoring the dead-or-alive status of the server; such communications may be performed by a number of different methods. The first method is a method in which heartbeat signals are periodically transmitted in one direction from the node 1 to the node 2. The second method is a method in which the node 1 sends back a response to inquiry signals from the node 2. In either case, when heartbeat signals from the node 1 are interrupted for a specified period of time or longer, the node 2 judges that a stopping of function (e.g., shutting down of the server due to a power supply abnormality, memory problem, OS panic or the like) has occurred in the node 1, and the node 2 therefore executes failover. As a result, the business application service that was previously provided by the node 1 is taken over by the node 2. It is possible to execute failover immediately when heartbeat communications are cut off; in ordinary cases, however, the temporary transmission delay of the heartbeat signals caused by the heavy burden on the node 1 and the like are taken into consideration, and a delay is built into the time that elapses until a judgment that trouble has occurred is made. In the present embodiment, the second heartbeat communications method, i.e., a method in which the node 1 sends back a response when called by the node 2, is shown as an example. Furthermore, dead-or-alive monitoring by means of heartbeat communications can also be accomplished using a simple signal such as a "ping". In addition, for example, heartbeat communications can also be performed while exchanging computer status information (resource consumption state of the CPU, memory or the like, number of file access requests and the like) between the two nodes 1 and 2.

Like the node 1, the node 2 that constitutes the "second computer" is constructed as a computer system. The node 2 is connected to a plurality of client computers via the communications networks CN1 and CN2. The node 2 is connected to the node 1 via the communications network CN3, and is connected to the shared disk 3 via a communications networks CN5. Like the node 1, the node 2 comprises a failover program 21, an installation program 22, a BIS 23, a communications memory 24, an OS 25, and IOP 26, a business application 27, an input-output circuit (not shown in the figures) and the like. As seen from the business application service (hereafter abbreviated to "business service") provided by the node 1, the node 2 constitutes backup (i.e., a waiting server) for the node 1. Conversely, as seen from the business service provided by the node 2, the node 1 constitutes backup for the node 2. Specifically, the respective nodes 1 and 2 can separately provide the business service, and are mutual objects of failover.

The shared disk 3 is a logical storage region (logical unit) that is set in a physical storage region. The shared disk 3 is shared by the respective nodes 1 and 2. Node 1 service information D1 and node 2 service information D2 are stored on the shared disk 3. These types of service information D1 and D2 are used to execute failover. Specifically, information that is required for the taking over of the business service of the node 1 by the node 2 is contained in the node 1 service information D1, and information that is required for the taking over of the business service of the node 2 by the node 1 is contained in the node 2 service information D2. In more concrete terms, when the node 2 takes over the business service of the node 1, the file system that has the node 1 service information D1 is unmounted from the node 1 and mounted in the node 2. Various types of business services such as customer management, product management, financial management, video distribution and the like may be cited as examples of business services.

Next, the functional construction of the node 1 will be described with reference to FIG. 2. Furthermore, in FIGS. 2 and 3, the business applications 17 and 27 are omitted for convenience of description.

The failover program 11 that corresponds to the "failover control part" comprises a heartbeat transmitting and receiving function 111, a heartbeat transmission stop receiving function 112, a failover function 113, a failback function 114, and a service stop function 115. The heartbeat transmitting and receiving function 111 is a program module which is used to perform heartbeat communications with the node 2 via the communications network CN3 from an LAN interface (not shown in the figures) in the node 1. The heartbeat transmission stop receiving function is a program module which is used to receive heartbeat transmission stop requests that are issued by the installation program 12, and to stop the heartbeat communications intentionally and voluntarily.

The failover function 113 is a program module which is started when the heartbeat communications are interrupted for a specified period of time or longer, and which is used to take over and perform the business service provided by the node 2 that constitutes the failover source. The failover function 113 takes over the data (file system) D2, IP addresses and the like used in the provision of the business service, and provides this business service to the client computers. The failback function 114 is a program module which is used to return the business service of the node 1 that has been taken over and performed by the node 2 to the node 1. The failback function 114 is started when the upgrading of the version of the OS 15 is completed; this function requests the stopping of failover with respect to the failover function 213 of the node 2. As a result, the file system (node 1 service information D1) that was being used by the node 2 is unmounted from the node 2 and again mounted in the node 1. The service stop function 115 is a program module which is used to stop the business service provided by the node 1.

The installation program 12 that corresponds to the "installation preparation program" or "installation preparation part" comprises a starting method write function 121 and a heartbeat transmission stop request function 122. The starting method write function 121 is a program module which is used to write the starting method of the node 1 into the communications memory 14. The starting method write function 121 writes a starting method indicator flag into the communications memory 14. The heartbeat transmission stop request function 122 is a program module which is used to request the stopping of heartbeat transmission from the failover program 11. Here, the installation program 12 can be stored beforehand in a storage device (local disk, ROM or the like) in the node 1. Alternatively, the installation program 12 can be stored in the storage medium 4, and used after being copied into the node 1 from the storage medium 4.

The BIOS (basic input/output system) 13 comprises a starting destination altering function 131. The starting destination altering function is a program module which is used to alter the starting destination of the OS 15 on the basis of the starting method indicator flag that is written into the communications memory 14. Together with the IOP 16, the BIOS 13 constitutes the "installation control part". Furthermore, the "installation control part" may also be viewed as being constructed by the BIOS 13, communications memory 14 and IOP 16.

The communications memory 14 is a memory that is used form communications between the IOP 16 and OS 15. For example, this communications memory 14 is constructed as a nonvolatile memory such as a flash memory, FeRAM (ferroelectric random access memory), MRAM (magnetoresistive random access memory), phase-change memory (ovonic unified memory) or the like. In the present embodiment, the starting method indictor flag 141 and a diagnosis indicator flag 142 are written into the communications memory 14. The starting method indicator flag 141 constitutes information that is set by the starting method write function 121 of the installation program 12 prior to the upgrading of the version of the OS 15. It is indicated in the starting method indicator flag 141 whether the OS is started from the storage medium 4 or started from the ordinary system disk. The diagnosis indicator flag 142 constitutes information that is set by a diagnostic program 43 stored in the storage medium 4. In the diagnosis indicator flag, it is indicated whether or not the diagnostic program 43 is to be executed following version upgrading.

The OS 15 comprises a diagnostic program execution function 151 and a stop receiving function 152 as constructions relating to the present embodiment. The diagnostic program execution function is used to execute the diagnostic program 43 that is stored in the storage medium 4. The stop receiving function 152 is used to stop the operation of the OS 15 on the basis of requests from the IOP 16.

The IOP 16 is a program that is used to control input and output. The IOP 16 has an other-node restart request function 161 and a restart receiving function 162. The other-node restart request function is a program module which is used to request restarting from the companion node that is the object of failover (i.e., the node 2 as seen from the node 1). The restart receiving function 162 is a program module which is used to restart the OS 15 in response to a restart request from the companion node.

Figure 2:
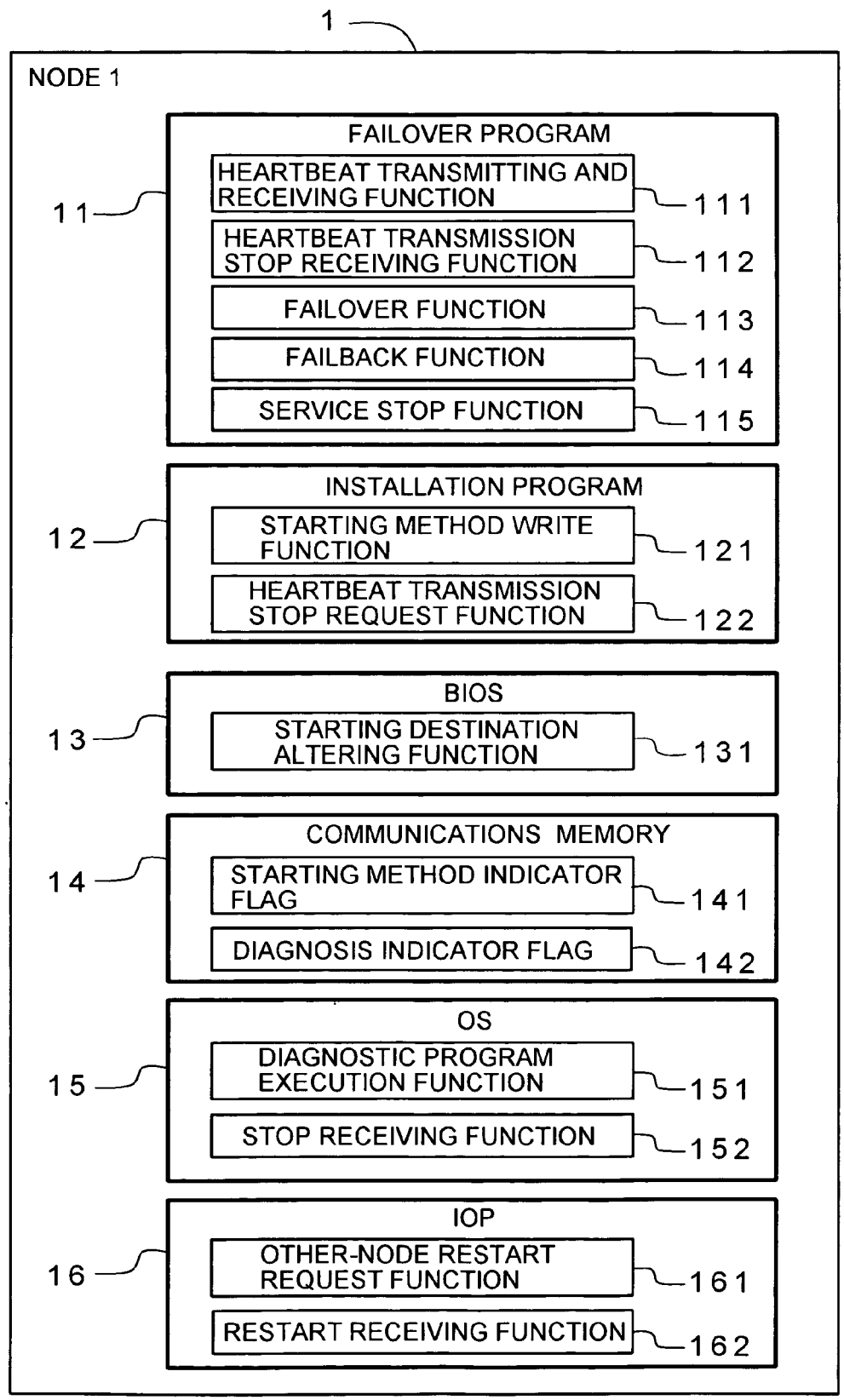
FIG. 2 is an explanatory diagram which shows the functional construction of node 1.

Here, the relationship of the various constructions shown in FIG. 2 will be briefly described. The communications memory 14 is hardware. The other parts, i.e., the failover program 11, installation program 12, BIOS 13, OS 15 and IOP 16 are respectively items of software. Furthermore, the failover program 11 and installation program 12 are constructed as application programs that are executed by the OS 15 (the business application 17 is also constructed as an application program). Furthermore, the BIOS 13 and IOP 16 are constructed as items of firmware that are executed at a level lower than the OS 15. Accordingly, the BIOS 13 and IOP 16 can be executed even when the OS 15 is stopped.

Figure 3:
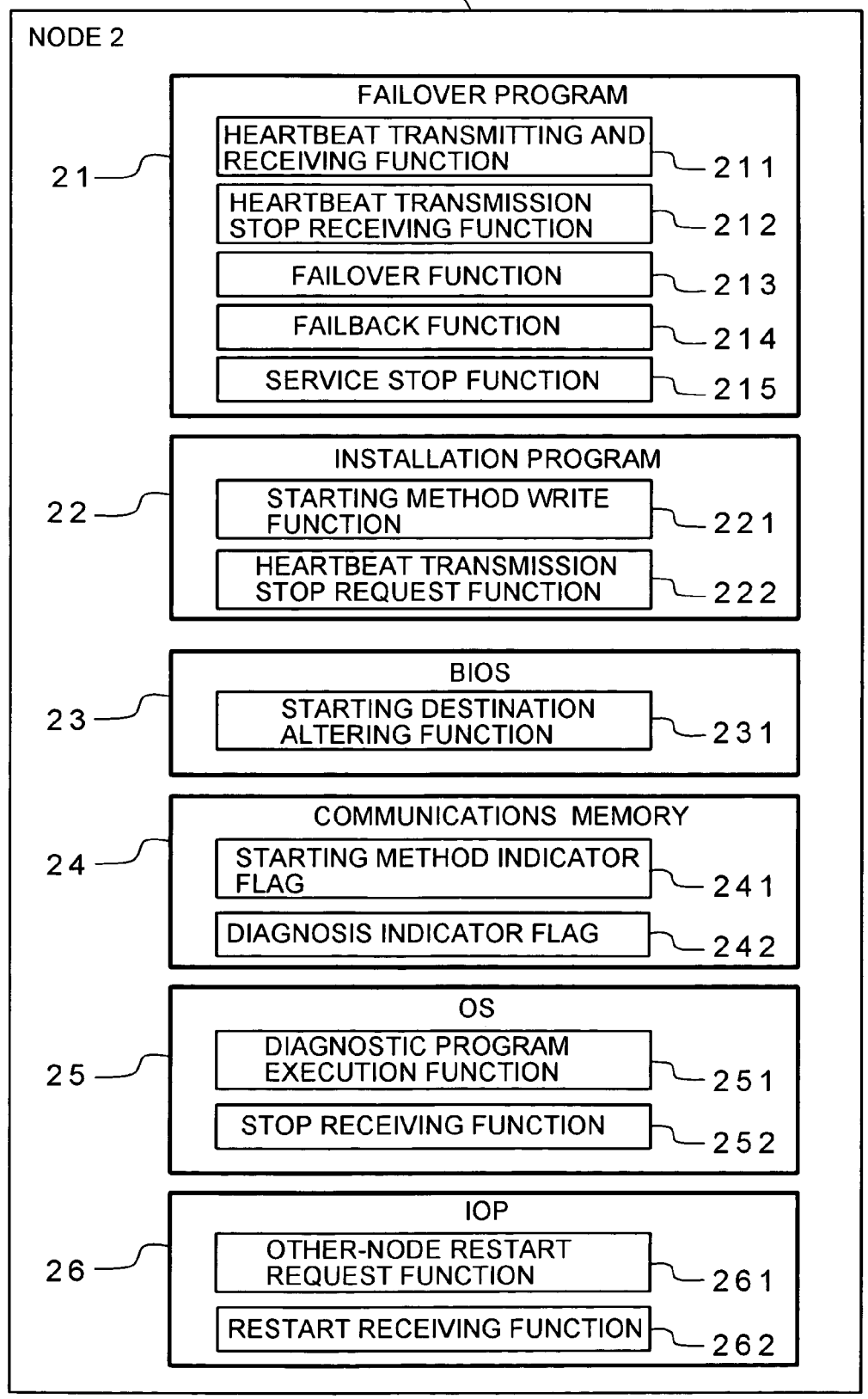
FIG. 3 is an explanatory diagram which shows the functional construction of node 2.

The functional construction of the node 2 is shown in FIG. 3. The node 2 has a construction similar to that of the node 1 described with reference to FIG. 2. Specifically, the failover program 21 comprises a heartbeat transmitting and receiving function 211, a heartbeat transmission stop receiving function 212, a failover function 213, a failback function 214 and a service stop function 215. The installation program 22 comprises a starting method write function 221 and a heartbeat transmission stop request function 222. The BIOS 23 comprises a starting destination altering function 321. A starting method indicator flag 241 and a diagnosis indicator flag 242 are respectively stored in the communications memory 24. The OS 25 comprises a diagnostic program execution function 251 and a stop receiving function 252. The IOP 26 comprises an other-node restart request function 261 and a restart receiving function 262. The contents of these respective functions are the same as those described for the node 1.

The functions executed by the node 1 when the version of the OS 15 of the node 1 is upgraded and the functions executed by the node 2 when the version of the OS 25 of the node 2 is upgraded are the same. By the same token, the functions executed by the node 2 when the version of the OS 15 of the node 1 is upgraded and the functions executed by the node 1 when the OS 25 of the node 2 is upgraded are the same. Specifically, both the functions that are executed when the version of a given node's own OS is upgraded and the functions that are executed when the OS of the companion node is upgraded are contained in the constructions of the nodes 1 and 2 shown in FIGS. 2 and 3. Accordingly, when the version of the OS 15 of the node 1 is upgraded, only the relevant functions among the respective functions contained in the node 1 are executed.

Figure 4:
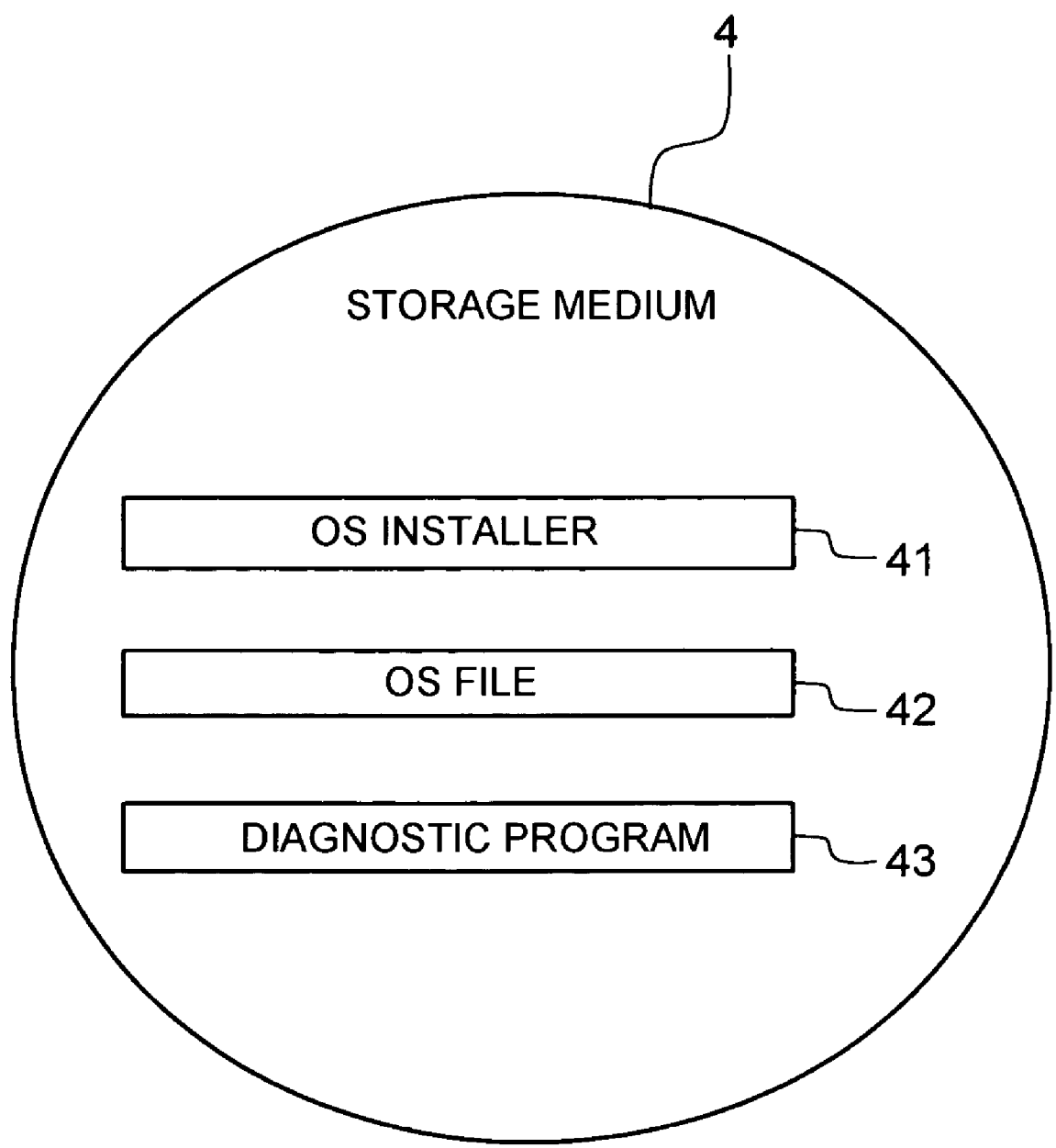
FIG. 4 is an explanatory diagram which shows the memory structure of the storage medium.

FIG. 4 is an explanatory diagram which shows the memory content of the storage medium 4 in model form. An OS installer program (hereafter abbreviated to "installer") 41, an OS file 42 and a diagnostic program 43 are respectively stored in the storage medium 4.

The installer 41 corresponding to the "installation execution part" or "installation execution program" is a program that installs the OS file 42 in the node 1. The OS file 42 corresponding to the "specified program" or "OS construction altering program" is a program that is used to improve the function of the OS 15 or the like. The diagnostic program 43 is a program which is used to perform specified tests following the upgrading of the version of the OS 15. Furthermore, the installation program 12 may also be stored in the storage medium 4. Moreover, in ordinary cases, the OS file 42 is a program that updates the construction of the OS to a new construction. However, the OS file 42 is not limited to this; this OS file may also be a program that restores the OS construction to an old construction.

Figure 5:
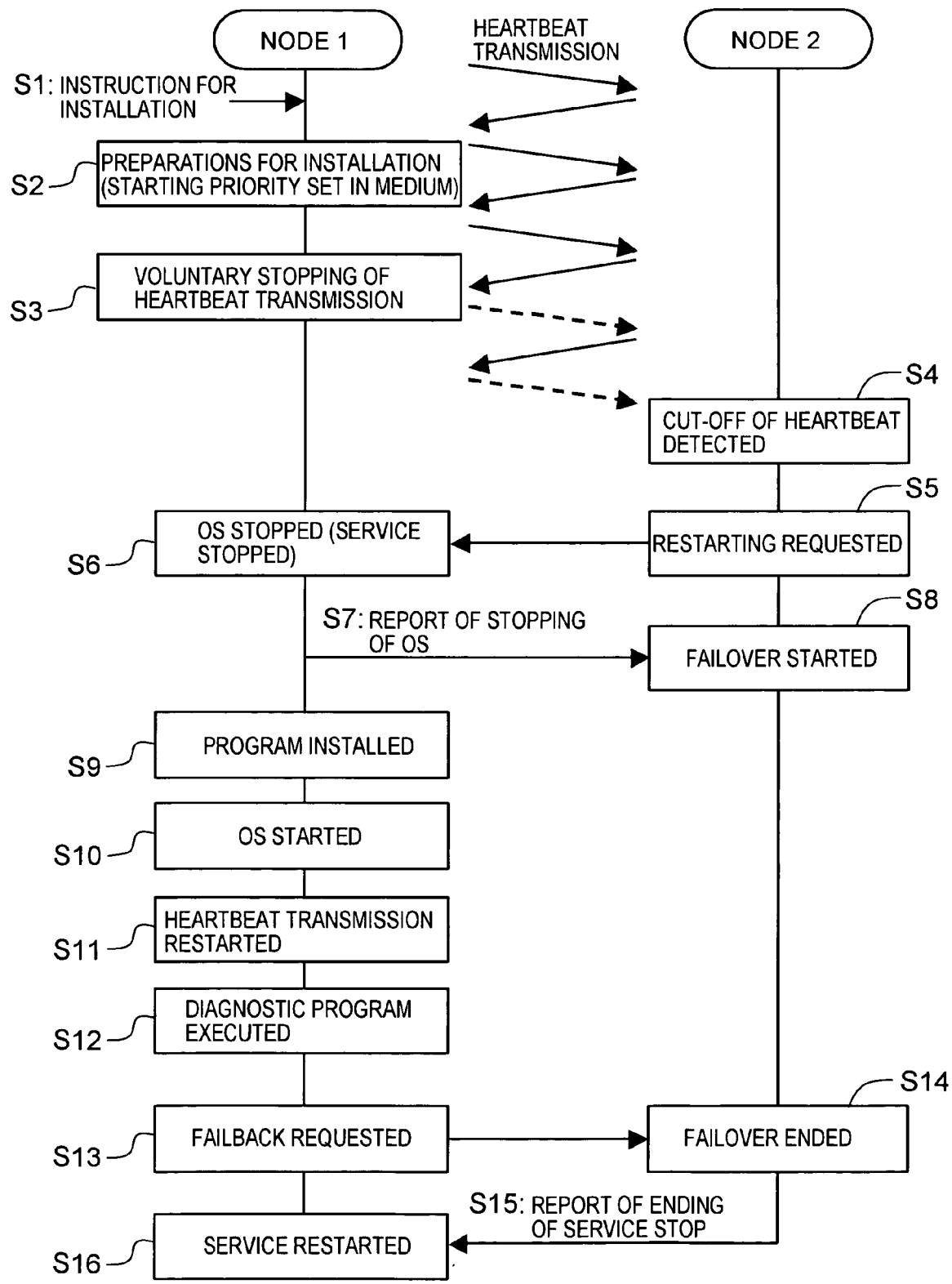
FIG. 5 is a flow chart which shows an overall outline of a case in which the version of the OS is upgraded by executing failover.

The operation of the present embodiment will be described with reference to FIGS. 5 through 8. First, FIG. 5 is a flow chart which shows an overall outline of the method used to upgrade the version of the OS utilizing the above-mentioned failover cluster system. Furthermore, the communications performed between the respective nodes 1 and 2 as described below are performed via the communications network CN3.

First, the manager mounts the storage medium 4 in the node 1, and gives instructions for the installation of a new OS file 42 in the node 1 via the user interface (not shown in the figures) of the node 1 (S1). When installation instructions are thus provided by the manager, the starting method write function 121 of the installation program 12 sets the content of "starting from the storage medium 4" in the starting method indicator flag 141 of the communications memory 14 (S2). Next, the heartbeat transmission stop request function 122 of the installation program 12 requests the failover program 11 for the stopping of heartbeat communications. In response to this request from the installation program 12, the heartbeat transmission stop receiving function 112 of the failover program 11 voluntarily stops the heartbeat communications with the node 2 (S3).

The failover program 21 of the node 2 constantly monitors the heartbeat communications with the node 1. When the heartbeat communications are interrupted for a specified period of time or longer, the failover program 21 of the node 2 judges that the functioning of the node 1 has stopped (S4). The IOP 26 of the node 2 requests the node 1 for restart (S5). When the IOP 16 of the node 1 receives a restart request from the node 2, this IOP 16 stops the OS 15 (S6). When the OS 15 is stopped, the provision of the service of the business application 17 is also stopped. When the OS 15 of the node 1 stops, the stopping of the OS is reported to the IOP 26 of the node 2 by the IOP 16 of the node 1 (S7). When the stopping of the OS of the node 1 is confirmed by the IOP 26 of the node 2, the failover program 21 of the node 2 executes failover on the basis of the node 1 service information D1 (S8). The node 2 takes over various resources (file system, IP addresses and the like) form the node 1, so that the business service that was provided by the node 1 is provided from the node 2. These steps S1 through S8 constitute a failover execution step. Viewed in greater detail, the failover execution step is constructed from installation preparation steps (S1, S2), heartbeat stopping steps (S3, S4) and failover steps (S5 through S8).

Next, the OS file 42 is installed in the node 1. The BIOS 13 of the node 1 refers to the starting method indicator flag 141 in the communications memory 14, and performs starting from the storage medium 4. As a result, the installer 41 stored in the storage medium 4 is started. The installer 41 installs the OS file 42 in the node 1 (S9). When the OS file 42 is installed so that the upgrading of the version of the OS 15 is completed, the BIOS 13 starts the OS 15 (S10).

As a result of the restarting of the OS 15, heartbeat communications by the failover program 11 are restarted (S11). Furthermore, the OS 15 refers to the diagnosis indicator flag 142 in the communications memory 14, and checks in order to ascertain where are not there are instructions for the execution of the diagnostic program. When there are instructions for the execution of the diagnostic program 43, the OS 15 reads out the diagnostic program 43 from the storage medium 4, and executes the diagnostic program 43 (S12). This diagnostic program 43 is a program which is used to perform a diagnosis as to whether or not the OS 15 is operating normally following the installation of the OS file 42. Furthermore, the restarting of the heartbeat communications (S11) and the execution of the diagnostic program (S12) are interchangeable in terms of the order in which these steps are performed. These steps S9 through S12 constitute a program installation step. Viewed in greater detail, this program installation step is constructed from installation execution steps (S9, S10), a heartbeat communications restarting step (S11) and a diagnostic program execution step (S12).

Next, the failback function 114 of the failover program 11 requests the failover program 21 of the node 2 for failback (S13). In response to such a failback request from the node 1, the failover program 21 of the node 2 stops the above-mentioned failover (S14). When the failover program 21 of the node 2 stops this failover, the failover program 21 reports the stopping of failover (i.e., reports the stopping of the provision of the business service) to the node 1 (S15). After confirming the stopping of the business service in the node 2, the failover program 11 of the node 1 restarts the business service performed by the business application 17 (S16). These steps S13 through S16 constitute a failback step.

Figure 6:
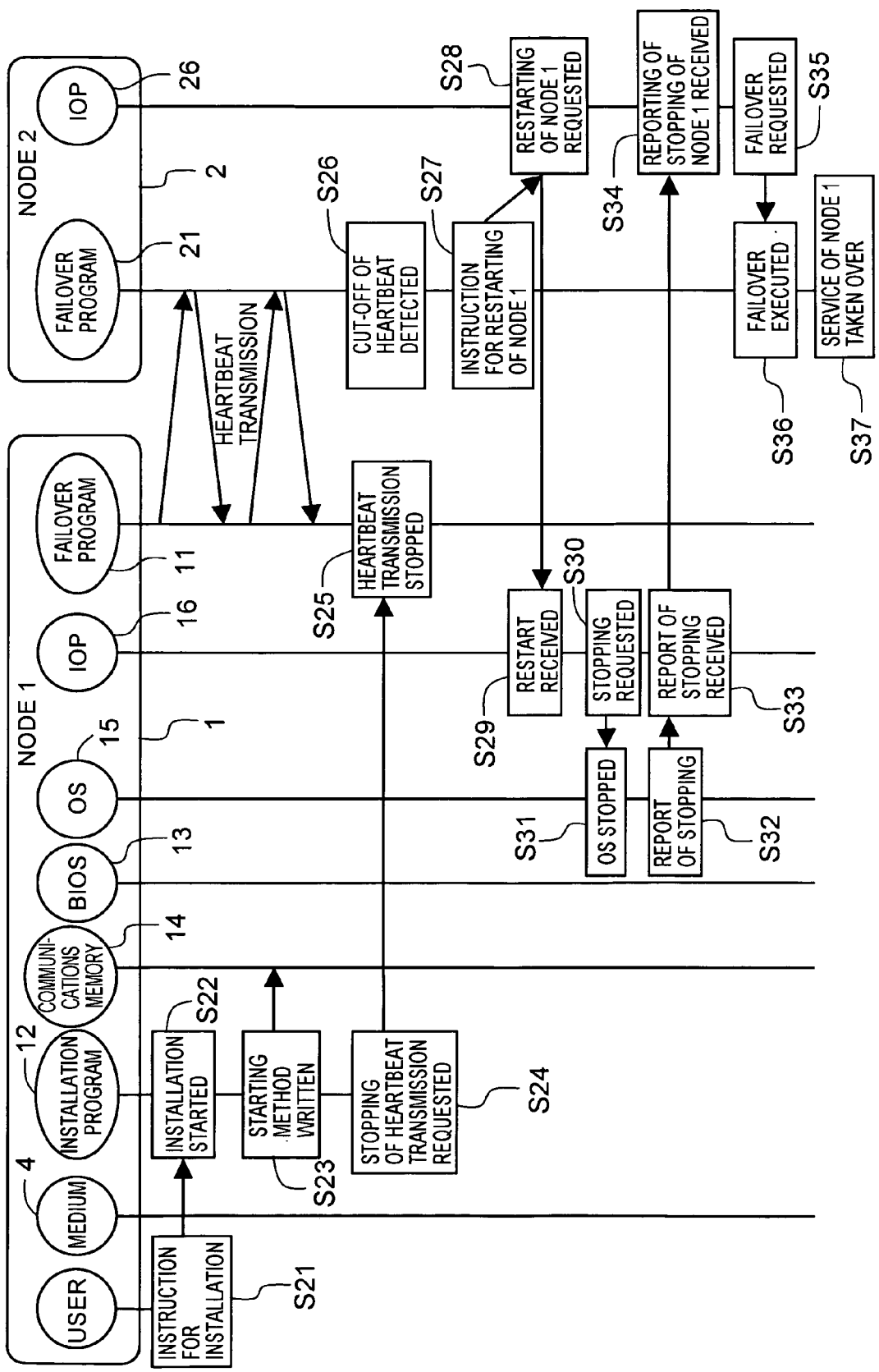
FIG. 6 is a flow chart which shows the details of the failover execution step in FIG. 5.

Next, the details of the operations performed in the respective steps will be described with reference to FIGS. 6 through 8. First, FIG. 6 shows the concrete processing of the failover execution steps.

Heartbeat communications are performed between the failover program 11 of the node 1 and the failover program 21 of the node 2. Choosing an appropriate time, the user (manager) gives instructions for the installation of the OS file 42 to the node 1 (S21). The installation program 12 is started by these instructions from the user (S22). The starting method write function 121 of the installation program 12 sets the content of "starting from the storage medium 4" in the starting method indicator flag 141 of the communications memory 14 (S23). Next, the heartbeat transmission stop request function 122 of the installation program 12 issues a heartbeat transmission stop request to the failover program 11 (S24).

Then, when the heartbeat transmission stop receiving function 112 of the failover program 11 receives a heartbeat transmission stop request from the installation program 12, the heartbeat transmitting and receiving function 111 of the failover program 11 stops the heartbeat communications (S25).

When a specified time elapses following the interruption of the heartbeat communications, the failover program 21 of the node 2 detects the stopping of the heartbeat communications (S26). The failover function 213 of the failover program 21 instructs the IOP 26 to request restarting of the node 1 (527). The other-node restart request function 261 of the IOP 26 requests the IOP 16 of the node 1 for restart of the node 1 (S28). This restart request signal is a signal that permits the upgrading of the version of the OS 15 as described below, and corresponds to the above-mentioned "installation permission signal".

When the IOP 16 (restart receiving function 162) of the node 1 receives a restart request from the IOP 26 of the node 2 (S29), the IOP 16 requests the OS 15 to stop operation (530). After receiving this stop request from the IOP 16, the OS 15 initiates a stop sequence (S31), and reports the stopping of the OS 15 to the IOP 16 (S32). When the IOP 16 receives a stop report from the OS 15, the IOP 16 notifies the IOP 26 of the node 2 that the OS 15 has stopped (S33). Furthermore, in the present embodiment, the stopping of the OS 15 and the stopping of the business service are performed at substantially the same time. However, the present invention is not limited to this; it would also be possible to stop the business service first, and then to stop the OS 15. The reason for this is that the stopping of the business service by the node 1 allow failover to be executed in the node 2.

When the IOP 26 of the node 2 receives an OS stop report from the node 1 (S34), the IOP 26 requests the failover program 21 for the execution of failover (S35). The failover function 213 of the failover program 21 executes failover in response to the request from the IOP 26 (S36). The failover function 213 of the node 2 refers to the node 1 service information D1 stored on the shared disk 3, and takes over the business service that was being performed by the node 1 (S37).

Figure 7:
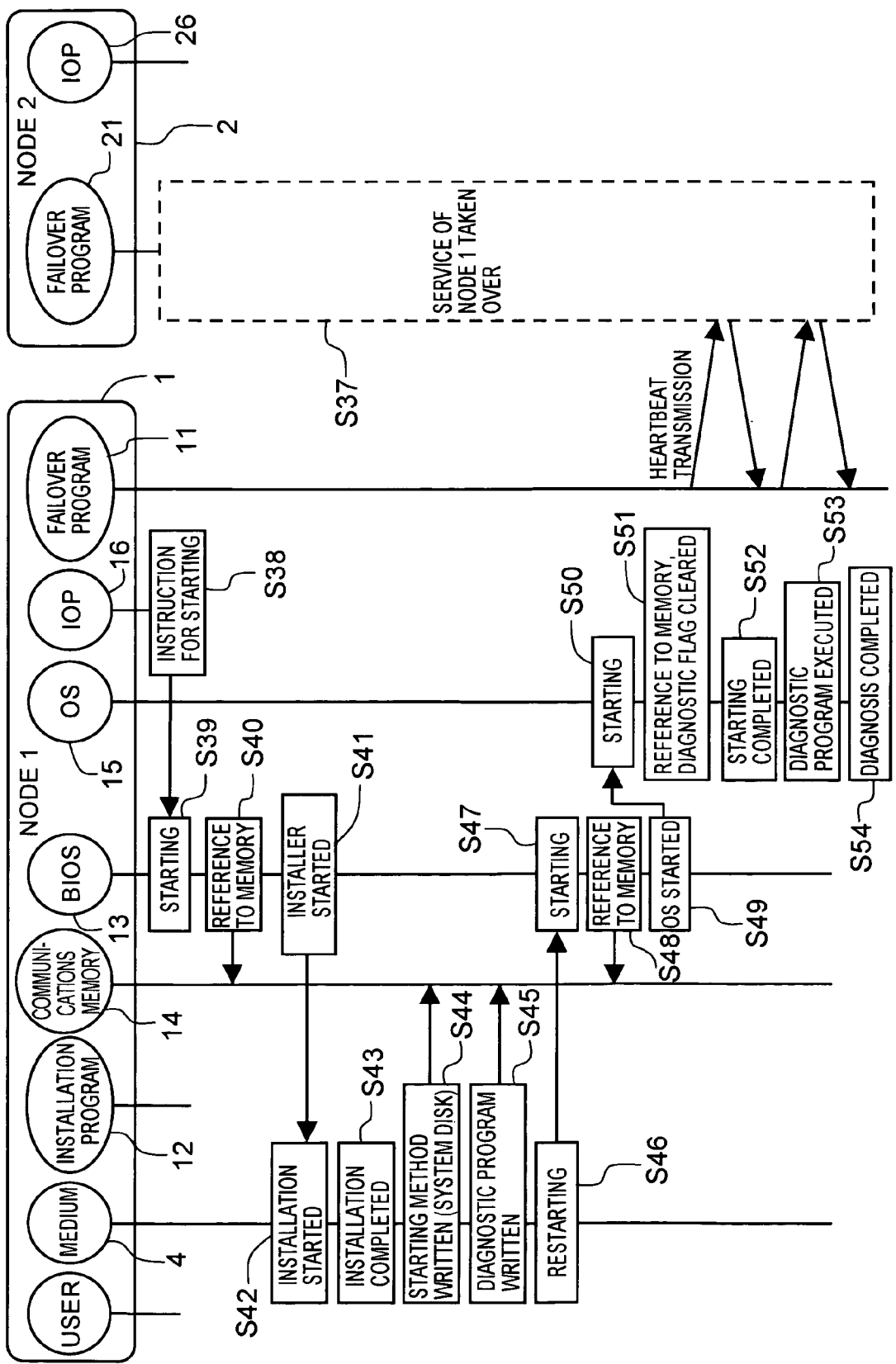
FIG. 7 is a flow chart which shows the details of the program installation step in FIG. 5.

Next, FIG. 7 is a flow chart which shows the program installation step. After reporting the stopping of the OS to the node 2 (S33), the IOP 16 of the node 1 instructs the BIOS 13 to start (S38).

The BIOS 13 starts in response to the start request from the IOP 16 (S39), and refers to the starting method indicator flag 141 in the communications memory 14 (S40). In the abovementioned S23, an indication of "starting from the storage medium 4" is noted by the installation program 12 in the starting method indicator lag 141. Accordingly, the BIOS 13 accesses the storage medium 4, and starts the installer 41 (S41).

The installer 41 initiates the installation of the OS file 42 stored in the storage medium 4 (S42). When the installation of the OS file 42 is completed (S43), the installer 41 sets an indication of "starting from the system disk" in the starting method indicator flag 141 of the communications memory 14 (S44). Furthermore, the installer 41 sets an indication of "diagnostic program 43 to be executed" in the diagnosis indicator flag 142 of the communications memory 14 (S45). After setting the starting method indicator flag 141 and diagnosis indicator flag 142, the installer 41 requests the BIOS 13 for restart (S46).

When restarting is requested by the installer 41, the BIOS 13 starts (S47), and refers to the starting method indicator flag 141 of the communications memory 14 (S48). Since an indication of "starting from the system disk" was set in the starting method indicator flag 141 in the abovementioned S44, the BIOS 13 starts the OS 15 from the system disk (S49).

As a result, the OS 15 whose version was upgraded by the installation of the OS file is started (S50). The OS 15 refers to the diagnosis indicator flag 142 of the communications memory 14, and resets the diagnosis indicator flag 142 after confirming that execution of the diagnostic program 43 is instructed (S51). After completion of the start (S52), the OS 51 executes the diagnostic program 43 stored in the storage medium 4 with the diagnostic program execution function 151 (S53). As a result of the execution of the diagnostic program 43, the diagnostic processing is completed if there are no abnormalities (S54). When an abnormality is discovered in the OS 15, the manager is notified. The manager who receives an error notification performs the re-installation of the OS file 42, the installation of a separate patch program or the like. Furthermore, when the OS 15 is restarted, the node 1 restarts heartbeat communications with the node 2. Furthermore, the business service of the node 1 is still carried on by the node 2 even after the OS 15 is restarted (S37).

Figure 8:
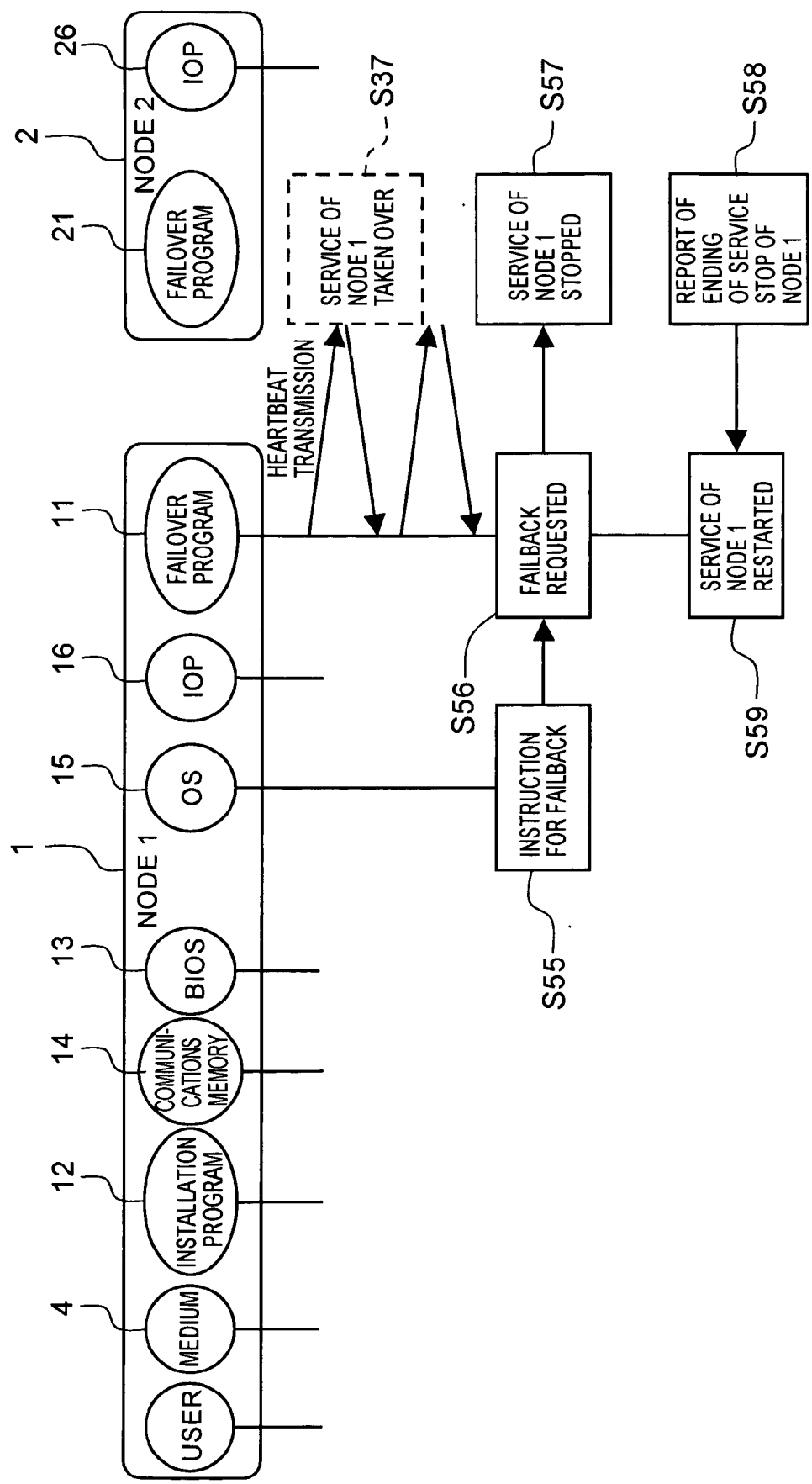
FIG. 8 is a flow chart which shows the details of the failback step in FIG. 5.

FIG. 8 is a flow chart which shows the concrete processing of the failback step. When the diagnostic processing performed by the diagnostic program 43 is completed (S54), the OS 15 instructs the failover program 11 to perform failback (S55). The failback function 114 of the failover program 11 requests the failover program 21 of the node 2 for failback (S56).

The failover program 21 of the node 2 ends failover by means of the service stop function 115, and stops the business service that had been carried on by the node 2 (S57). Then, the service stop function 115 of the failover program 21 reports the stopping of failover to the node 1 (S58).

When the failover program 11 of the node 1 receives a service stop report from the node 2, this program refers to the node 2 service information D2 on the shared disk 3, and restarts the business service (S59).

When a shared upgrading of the version is performed in the node 1 and node 2, the version of the OS 25 of the node 2 is upgraded using the same method as that described in the case of the node 1.

The present embodiment is constructed as was described in detail above, and possesses the following merits. First, when the node 2 detects a state of a stopped process (stopping of heartbeat communications) in the node 1, and an installation permission signal (restart signal) is transmitted from the node 2 to the node 1, the node 1 starts the installer 41 and initiates the installation of the OS file 42. Accordingly, the initiation of installation work in the node 1 can be triggered by instructions from the node 2, so that a specified program (OS file 42) can be installed by causing cooperation between the node 1 and node 2.

Furthermore, since the installation permission signal is associated with initiation of the execution of failover by the node 2, and failover by the node 2 is executed (S36) after the node 1 is instructed to restart by the node 2 (S27), cooperation between the execution of failover by the node 2 and the installation work performed by the node 1 can be achieved, so that installation work in the node 1 can be accomplished without any unnecessary interruption of the business service.

Furthermore, the user need merely give initial instructions for the installation of the OS file 42; there is no need to execute failover by a manual operation. Specifically, even in the case of a user that is unaccustomed to a failover cluster system, the version of the OS 15 can be upgraded in a simple manner while maintaining the continuity of the business service, so that the convenience of the system is improved.

Furthermore, since heartbeat communications are voluntarily stopped prior the installation work in a state in which the system is operating normally, the node 2 can be prompted to perform failover using an existing construction without any use of special commands, signals or the like, and installation work in the node 1 can be performed while failover is being executed by the node 2.

Furthermore, since the work of installing the OS file 42 is divided between an installation program 12 that performs installation preparations and an installer 41 that performs the actual installation work, the node 2 can be prompted to execute failover by stopping the heartbeat communications by means of the installation program 12, and the installer 41 can be caused to install the OS file 42 while failover is being executed by the node 2.

Furthermore, the installation program 12 that performs installation preparations requests the stopping of heartbeat communications, and sets "starting from the storage medium 4" in the starting method indicator flag 141 of the nonvolatile communications memory 14. Furthermore, the installer 41 alters the starting method indicator flag 141 to "starting from the system disk" after installation is completed. Accordingly, installation work following the execution of failover can be performed by the installation program 12 and installer 41 with hardly any alteration of the existing construction of the node 1. Consequently, the additional cost required in order to realize the present embodiment can be reduced.

Next, a first modification of the first embodiment will be described with reference to FIG. 9. In this modification, heartbeat communications are voluntarily stopped at the point in time at which there is a cut-off point in the business service that is being provided by the node 1.

Figure 9:
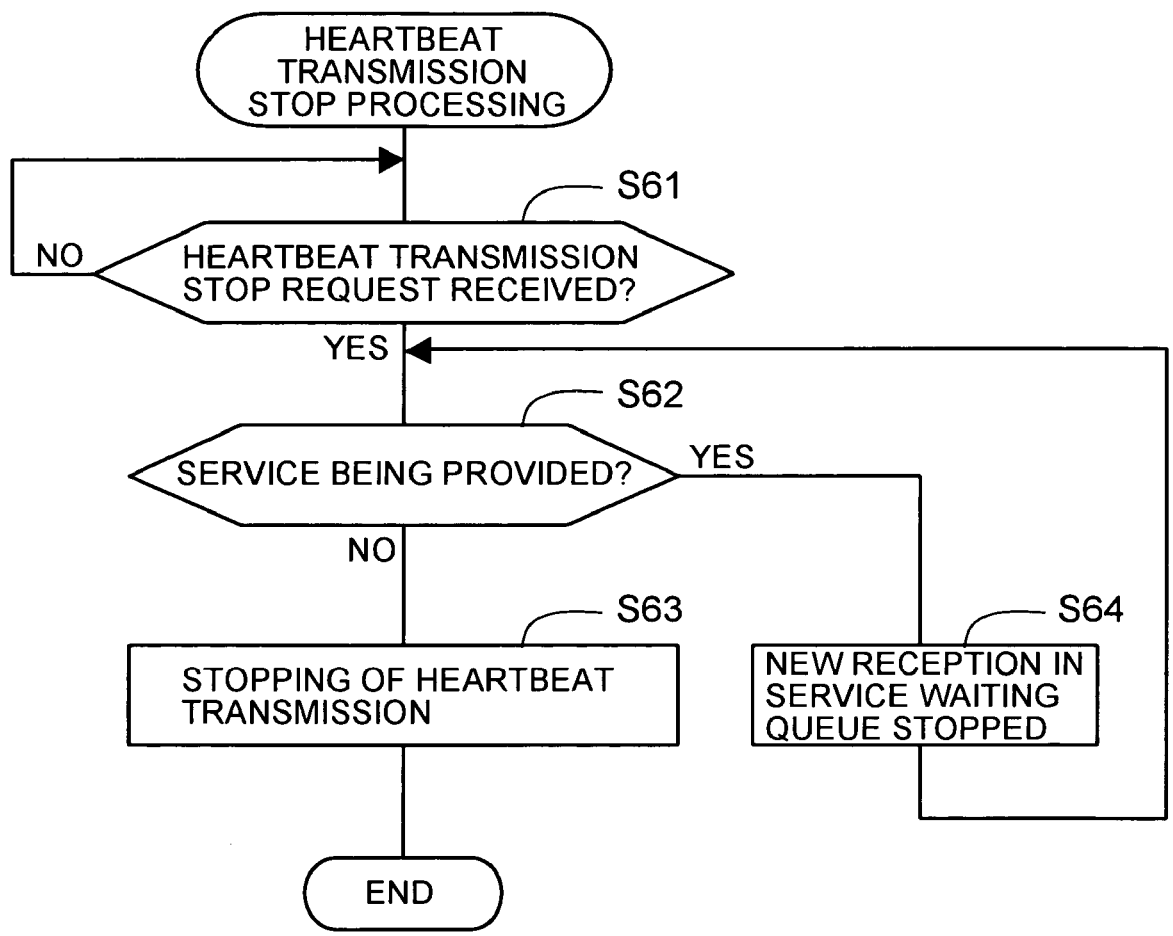
FIG. 9 is a flow chart which shows the heartbeat transmission stopping processing in a first modification.

The flow chart shown in FIG. 9 shows the details of S25 in FIG. 6. When the heartbeat transmission stop receiving function 112 of the failover program 11 receives a heartbeat transmission stop request from the installation program (S61: YES), the failover program 11 judges whether or not the business service is currently being provided (S62). When the business service is not being provided (S62: NO), heartbeat communications are immediately stopped. When the business service is being provided (S62: YES), the acceptance of new service requests in the service waiting queue is stopped (S64), and the processing returns to S62. When all of the service requests in the waiting queue have been processed, a judgment of "YES" is made in S62, and heartbeat communications are stopped (S63).

Figure 10:
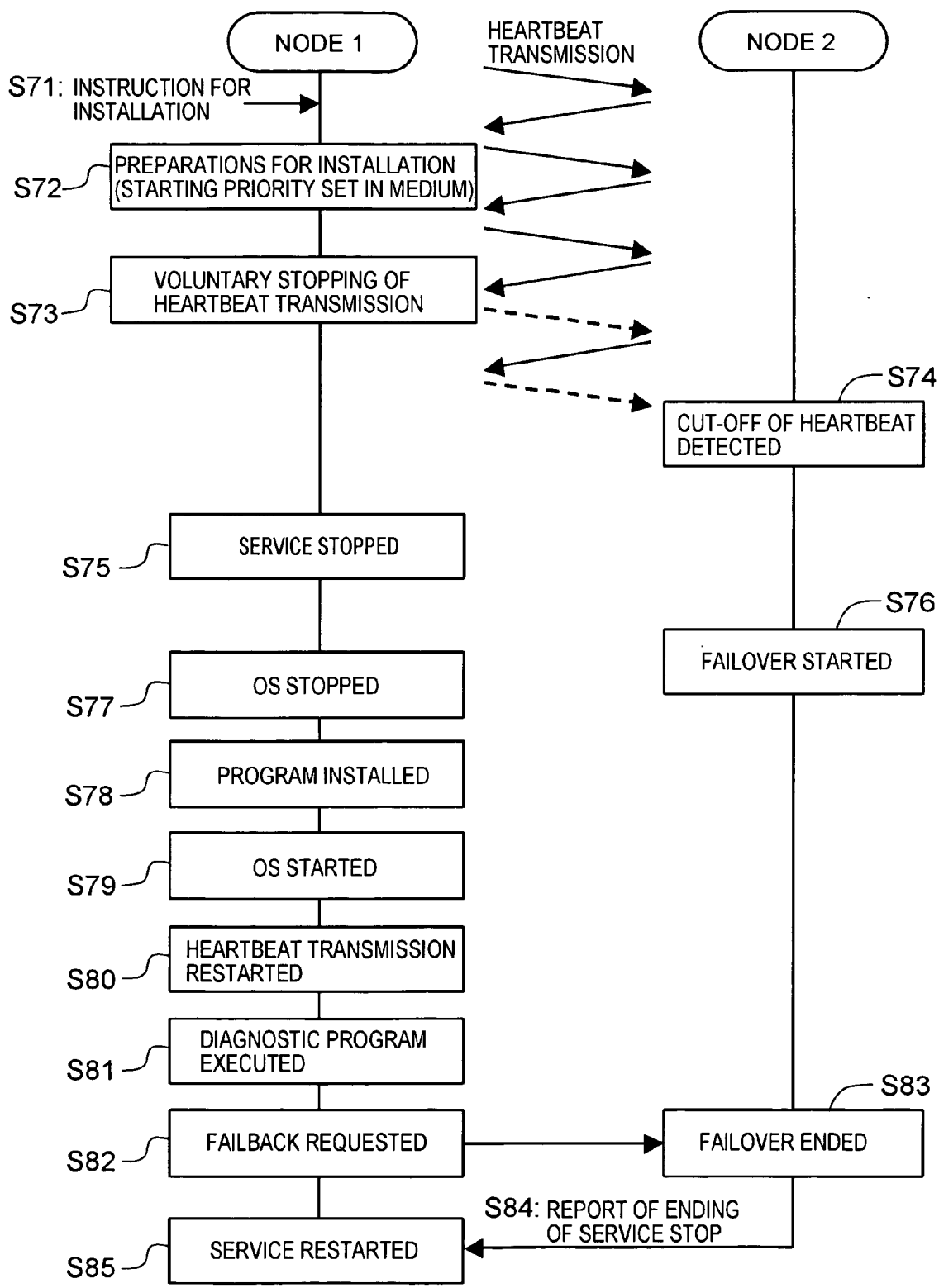
FIG. 10 is a flow chart which shows an outline of the overall operation in a second modification.

FIG. 10 is a flow chart which shows an outline of the overall operation of the failover cluster system in a second modification of the first embodiment. In this modification, the node 1 and node 2 are caused to cooperate loosely, and installation work in the node 1 is performed without confirming the execution of failover in the node 2.

When the user gives instructions for installation in the node 1 (S71), the installation program 12 sets "starting from the storage medium 4" in the starting method indicator flag 141 of the communications memory 14 (S72). When the installation program 12 transmits a heartbeat transmission stop request to the failover program 11, the failover program 11 voluntarily stops heartbeat communications in spite of the fact that the OS 15 is operating normally (S73).

When the node 2 detects the stopping of heartbeat communications (S74), the node 2 initiates failover (S76). Meanwhile, in the node 1, the business service is stopped after heartbeat communications have been stopped (S75). Here, the important point is that the timing of the two operations in the respective nodes 1 and 2 is adjusted so that failover is initiated by the node 2 after the business service has been stopped in the node 1 (S75). In concrete terms, the time at which the business service is stopped in the node 1 is set with consideration given to the time t1 extending from the point in time at which heartbeat communications are stopped to the point in time at which the stopping of the heartbeat communications is detected by the node 2, the time t2 extending from the abovementioned point in time to the point in time at which failover is executed in the node 2, and some surplus time (communications lag time and the like). As a result, upgrading of the version of the OS 15 can be performed following the execution of failover by the node 2 without obtaining a response signal from the node 2, i.e., without obtaining a response signal (restart signal in the first embodiment) signifying that the stopping of heartbeat communications has been recognized by the node 2 and the failover execution sequence has been initiated.

Specifically, in the node 1, the OS 15 is stopped at the time at which it is thought that failover has been executed by the node 2 (S77), and the OS file 42 is installed (S78). Subsequently, in the same manner as that described in FIG. 5, the node 1 restarts the OS 15 (S79), heartbeat communications are restarted (S80), and the diagnostic program 43 is executed (S81). Furthermore, then node 1 requests the node 2 for failback (S82). The node 2 then ends failover and reports the stopping of service (S83, S84), and the node 1 restarts the business service (S85).

Furthermore, the present invention is not limited to the respective embodiments described above. Various additions, alterations and the like may be made within the scope of the present invention by a person skilled in the art. For example, the in abovementioned embodiments, a case in which a cluster was formed from two nodes, i.e., a node 1 and a node 2, was described. However, the present invention can also be applied to a cluster formed from three or more nodes. In this case, the priority order of failover destination nodes that perform failover for a given node may be set in advance. The node with the highest priority plays the role of the node 2.

Furthermore, upgrading (updating) of the version of the OS was described as an example. However, the present invention is not limited to this, and may also be used when the version of the OS is downgraded. In addition, the present invention can also be used in the installation of various other types of programs that involve restarting of the nodes.

Moreover, the above description was centered on failover; however, the present invention can also be used when dispersion of the load is performed within the cluster. Specifically, the installation of programs in a state in which failover is started can also be performed by the present invention in cases were each of the nodes 1 and 2 provides its own characteristic business service.

What is claimed is:

1. A failover cluster system which comprises a first computer and second computer that are mutual objects of failover, and which causes failover to be executed on the basis of the state of heartbeat signal communications performed between said first computer and said second computer, wherein
    said first computer comprises:
    a first failover component which actuates failover by said second computer by voluntarily stopping said heartbeat signal communications on the basis of a heartbeat communications stop request that is issued prior to the installation of an OS construction altering program from an installation program that performs preparations for the installation of said construction altering program; and
    an installation control component which starts an installer program and causes said construction altering program to be installed by restarting said OS when a restart signal based on the stopping of said heartbeat signals is received from said second computer;
    said first failover component requests said second computer for failback when the installation of said construction altering program is completed;
    said second computer comprises:
    a second failover component which executes said failover when said heartbeat signal communications with said first computer are stopped; and
    a restart request component which transmits said restart signal to said first computer when said heartbeat signal communications with said first computer are stopped; and
    said second failover component stops the execution of said failover when said failback is requested from said first computer.

2. A failover cluster system which comprises a first computer and second computer that are mutual objects of failover, wherein
    said second computer transmits an installation permission signal to said first computer when a state in which the processing of said first computer is stopped is detected, and
    said first computer installs a specified program when said installation permission signal is received from said second computer,
    wherein said installation permission signal is associated with the execution of failover by said second computer,
    wherein said first computer requests said second computer for failback when the installation of said specified program is completed,
    wherein said first computer and said second computer judge whether or not failover execution is possible on the basis of the state of dead-or-alive confirmation signal communications performed between the two computers, and
    wherein said first computer causes said state of a stopped process to be realized by voluntarily stopping said dead-or-alive confirmation signal communications prior to the installation of said specified program.

3. The failover cluster system according to claim 2, wherein said first computer causes said state of a stopped process to be realized by voluntarily stopping said dead-or-alive confirmation signal communications, prior to the installation of said specified program, on the basis of a request from an installation preparation part that performs preparations for the purpose of installing said specified program, and
    said first computer further installs said specified program by starting an installation execution part when said installation permission signal is transmitted from said second computer on the basis of the stopping of said dead-or-alive confirmation signal communications.

4. The failover cluster system according to claim 3, wherein said specified program and said installation execution part are respectively stored in a program storage medium,
    said installation preparation part causes the starting method of said first computer to be altered from the ordinary setting so that this computer is started on the basis of said program storage medium and issues a request so that said dead-or-alive confirmation signal communications are voluntarily stopped,
    said installation permission signal that is transmitted from said second computer to said first computer on the basis of the stopping of said dead-or-alive confirmation signal communications is a signal that requests restart of said first computer, and
    said installation execution part is a part which installs said specified program in said first computer when being started by the restart of said first computer, and which alters the starting method of said first computer to said ordinary setting when the installation of said specified program is completed.

5. A program installation method using a failover cluster system which installs a specified program in a first computer using a failover cluster system comprising said first computer and a second computer that are mutual objects of failover, wherein
    said second computer executes the steps of:
    (a) detecting whether or not said first computer is in a state of a stopped process; and
    (b) transmitting an installation permission signal to said first computer when said state of a stopped process; and
    said first computer executes the steps of:
    (c) generating said state in which processing is stopped prior to the installation of said specified program; and
    (d) installing said specified program when said installation permission signal is received from said second computer, and
    wherein said first computer and said second computer judge whether or not failover execution is possible on the basis of the state of dead-or-alive confirmation signal communications performed between the two computers, and
    said step (c) includes the step of voluntarily stopping said dead-or-alive confirmation signal communications prior to the installation of said specified program.

6. The method according to claim 5, wherein said installation permission signal is associated with the execution of failover by said second computer.

7. The method according to claim 5, wherein said first computer requests said second computer for failback when the installation of said specified program in said step (d) is completed.

8. The method according to claim 5, wherein said step (a) includes the step of detecting whether or not said first computer is in a state of a stopped process based on the stoppage of the dead-or-alive confirmation signal communications from said first computer.

9. The method according to claim 5, wherein said step (d) is carried out by reading in an installation program stored in a program storage medium.

10. The method according to claim 9, wherein said first computer memorizes a table for storing a startup-method instruction flag instructing a startup-method of said first computer;

wherein the method further comprises the step of registering a first startup-method instruction flag instructing to start said first computer according to said installation program stored in said program storage medium;

wherein said installation permission signal in said step (b) is a signal for requesting a startup of said first computer; and wherein said step (d) includes the steps of:

in case of receiving said installation permission signal, checking whether or not said startup-method instruction flag in said table is said first flag;

in response to a check result of said step of checking, reading-out said installation program from said program storage medium, re-starting said installation program, and installing said specified program into said first computer; and in the case where said the installation of said specified program is completed, changing said startup-method instruction flag in said table to a second flag.

11. A program installation method using a failover cluster system which installs a specified program in a first computer using a failover cluster system comprising said first computer and a second computer that are mutual objects of failover, wherein said second computer executes the steps of:

(a) detecting whether or not said first computer is in a state of a stopped process; and (b) transmitting an installation permission signal to said first computer when said state of a stopped process; and said first computer executes the steps of:

(c) generating said state in which processing is stopped prior to the installation of said specified program; and (d) installing said specified program when said installation permission signal is received from said second computer, wherein said step (d) is carried out by reading in an installation program stored in a program storage medium;

wherein said first computer memorizes a table for storing a startup-method instruction flag instructing a startup-method of said first computer;

wherein the method further comprises the step of registering a first startup-method instruction flag instructing to start said first computer according to said installation program stored in said program storage medium;

wherein said installation permission signal in said step (b) is a signal for requesting a startup of said first computer; and wherein said step (d) includes the steps of:

in case of receiving said installation permission signal, checking whether or not said startup-method instruction flag in said table is said first flag;

in response to a check result of said step of checking, reading-out said installation program from said program storage medium, re-starting said installation program, and installing said specified program into said first computer; and in the case where said the installation of said specified program is completed, changing said startup-method instruction flag in said table to a second flag.

12. The method according to claim 11, wherein said installation permission signal is associated with the execution of failover by said second computer.

13. The method according to claim 11, wherein said first computer requests said second computer for failback when the installation of said specified program in said step (d) is completed.

14. The method according to claim 11, wherein said step (a) includes the step of detecting whether or not said first computer is in a state of a stopped process based on the stoppage of the dead-or-alive confirmation signal communications from said first computer.

* * * * *